(12) United States Patent
Cox

(10) Patent No.: US 7,500,583 B1
(45) Date of Patent: Mar. 10, 2009

(54) ATTACHMENT FOR A SURVEYOR'S INSTRUMENT

(76) Inventor: Enoch Cox, 15305 N. Trenton, Skiatook, OK (US) 74070

(*) Notice: Subject to any disclaimer, the term of this patent is extended or adjusted under 35 U.S.C. 154(b) by 610 days.

(21) Appl. No.: 11/002,502

(22) Filed: Dec. 2, 2004

(51) Int. Cl.
*B65D 83/00* (2006.01)

(52) U.S. Cl. ............... 222/402.1; 222/181.1; 239/360; 401/264

(58) Field of Classification Search .......... 222/402.1, 222/402, 402.19, 402.24, 402.13, 181.1–181.3, 222/182–184; 239/360–364, 288, 288.3, 239/288.5; 401/190, 118, 264
See application file for complete search history.

(56) References Cited

U.S. PATENT DOCUMENTS

| | | | | |
|---|---|---|---|---|
| 3,765,573 A | * | 10/1973 | Landsman | ............... 222/182 |
| 3,946,911 A | * | 3/1976 | Morane et al. | .......... 222/402.11 |
| 5,335,832 A | * | 8/1994 | de Laforcade | .......... 222/402.13 |
| 5,358,147 A | * | 10/1994 | Adams et al. | ............... 222/183 |
| 5,641,095 A | * | 6/1997 | de Laforcade | ............. 222/182 |
| 6,021,927 A | * | 2/2000 | Nomiyama et al. | .... 222/402.14 |
| 6,267,274 B1 | * | 7/2001 | Smrt | .......................... 222/646 |
| 6,663,307 B2 | * | 12/2003 | Kopanic et al. | ............. 401/190 |

* cited by examiner

*Primary Examiner*—Lien T Ngo
(74) *Attorney, Agent, or Firm*—Gable & Gotwals

(57) ABSTRACT

An attachment triggers dispensation of paint through the valve of an inverted aerosol can onto a surface target in response to manipulation of a surveyor's rod or pole. A coupling connects the attachment to the lower end of the surveyor's instrument and a cap seals against the valve end of the inverted aerosol can. A support structure holds the coupling, the inverted aerosol can and the cap together for motion in unison. A nozzle defines a path of pneumatic communication from the valve through the cap. The portion of the cap surrounding the nozzle is resiliently pliable so that, when the nozzle is rested on and the surveyor's instrument is pressed toward the surface target, the resiliently pliable portion of the cap flexes to actuate the valve and dispense paint through the nozzle onto the surface target.

22 Claims, 2 Drawing Sheets

ATTACHMENT FOR A SURVEYOR'S INSTRUMENT

BACKGROUND OF THE INVENTION

This invention relates generally to surveying equipment and more particularly concerns a target marking attachment for a surveyor's line rod, prism pole, GPS system rover rod or the like.

In present practice, surveying partners determine a target point by shooting a line and distance using surveyors' instruments and making a hole in the surface at the correct target point. Because it is difficult to make a hole precisely at the correctly determined target point, multiple shootings are generally necessary before the surveyors are satisfied with the accuracy of a hole. Subsequently, the surveyors drive a nail or piece of rebar into the selected hole to monument the point. This process is time consuming, not only because it is repetitious, but because it requires the use of separate instruments and tools to shoot, mark and monument points. Moreover, depending on the nature of the surface to be marked, driving the nails or rebar can be a laborious task.

It is, therefore, an object of this invention to provide an attachment for a surveyor's instrument which facilitates marking of a correct target point. Another object of this invention is to provide an attachment for a surveyor's instrument which facilitates precise marking of a correct target point. A further object of this invention is to provide an attachment for a surveyor's instrument which enables marking a target point without removing the surveyor's instrument from the target point. Yet another object of this invention is to provide an attachment for a surveyor's instrument which reduces the need for shooting multiple target points in order to achieve an accurate target point. It is also an object of this invention to provide an attachment for a surveyor's instrument which eliminates the need for nails, rebar and special tools to monument a target point. Still another object of this invention is to provide an attachment for a surveyor's instrument which eliminates the expenditure of time and labor to monument a target point.

SUMMARY OF THE INVENTION

In accordance with the invention, an attachment is provided for triggering dispensation of paint through the valve of an inverted aerosol can onto a surface target in response to manipulation of a surveyor's instrument, such as a line rod, a prism pole or a GPS system rover rod. The attachment has a coupling adapted to connect to the lower end of the surveyor's instrument and a cap adapted to seal against the valve end of the inverted aerosol can. A support structure holds the coupling, the inverted aerosol can and the cap together for motion in unison. A nozzle defines a path of pneumatic communication from the valve through the cap. The portion of the cap surrounding the nozzle is resiliently pliable so that, when the nozzle is rested on and the surveyor's instrument is pressed toward the surface target, the resiliently pliable portion of the cap flexes to actuate the valve and dispense paint through the nozzle onto the surface target.

Preferably, the coupling, cap and support structure co-operate to align the surveyor's tool, the valve of the aerosol can and the nozzle on a common axis so as to focus the force applied to the instrument directly at the target surface. The coupling and support structure are sufficiently rigid to resist distortion when the resiliently pliable portion of the cap is flexed.

Preferably, the nozzle has an upper throat which tapers upwardly and outwardly to form a seat to guide the valve of the aerosol can into engagement against the nozzle. A middle throat tapers downwardly and outwardly from the lower end of the upper throat to expand the nozzle. A lower throat extends cylindrically downwardly from the lower end of the middle throat to the target end of the nozzle. A cylindrical throat of approximately one inch inside diameter defines a target surface of acceptable tolerance. At least one vent hole through the cylindrical throat side wall reduces the possibility of clogging the nozzle during repeated use.

Preferably, the cap is adapted to seal against the rim of the valve end of the aerosol can and the upper throat of the nozzle extends upwardly from the cap and is aligned and contoured to seat the valve of the aerosol can when the cap is sealed against the rim of the can.

Preferably, the support structure is a cylindrical container of height substantially equal to the height of the aerosol can. The upper end of the container is adapted for concentric connection to the lower end of the surveyor's instrument. The cap screws onto the lower end of the container and has a concentric resiliently pliable central portion with a concentric central aperture. The upper throat of the nozzle extends concentrically upwardly to the valve of the aerosol can and the middle and lower throats of the nozzle extend concentrically downwardly from the upper throat.

Preferably, the coupling includes an inside-threaded tube so as to easily engage on the lower end of the surveyor's instrument and to facilitate rapid transfer of the same attachment from one instrument to another and the cap screws onto the container to permit easy replacement of the aerosol can in the attachment.

In an alternative embodiment, rather than a resiliently pliable cap portion, the nozzle reciprocally slides in and extends through the cap and compression spring biases the can against motion toward the nozzle. When the surveyor's instrument is pressed downwardly the bias is overcome, activating the valve.

In any of the above embodiments, the coupling and cap are joined by an associated connecting structure. However, the connecting structure may be eliminated by securing the coupling and cap directly to the can, thus using the can as the connecting structure.

BRIEF DESCRIPTION OF THE DRAWINGS

Other objects and advantages of the invention will become apparent upon reading the following detailed description and upon reference to the drawings in which.

Figure 1:
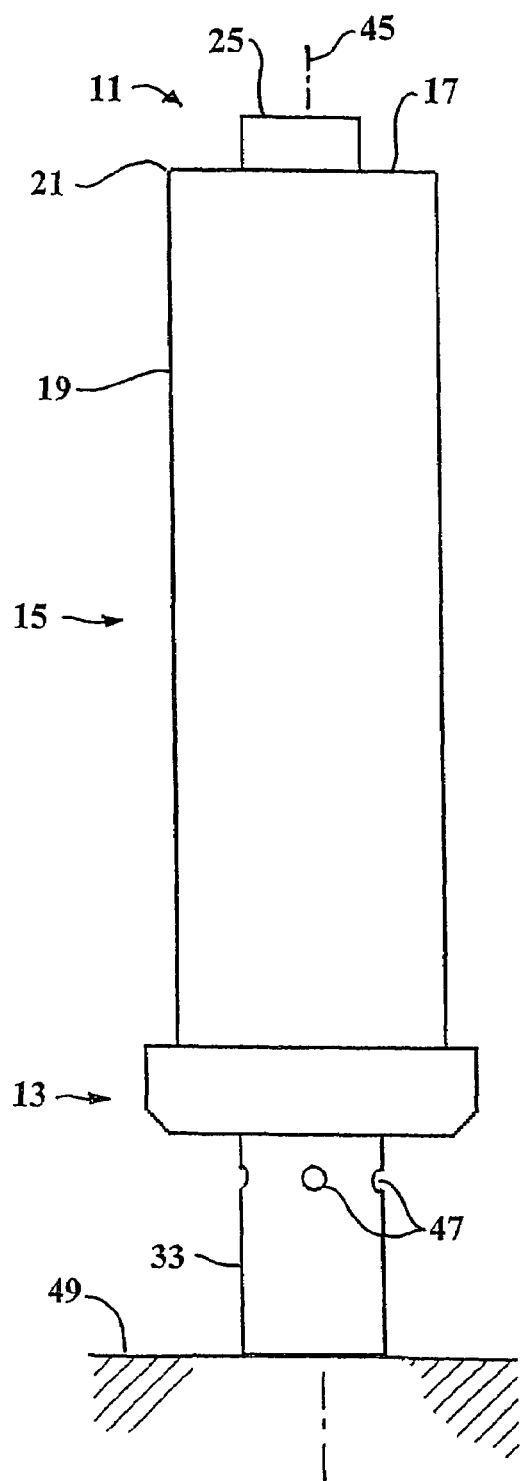
FIG. 1 is an elevation view of a preferred embodiment of the target surface marking attachment for a surveyor's instrument.
Figure 2:
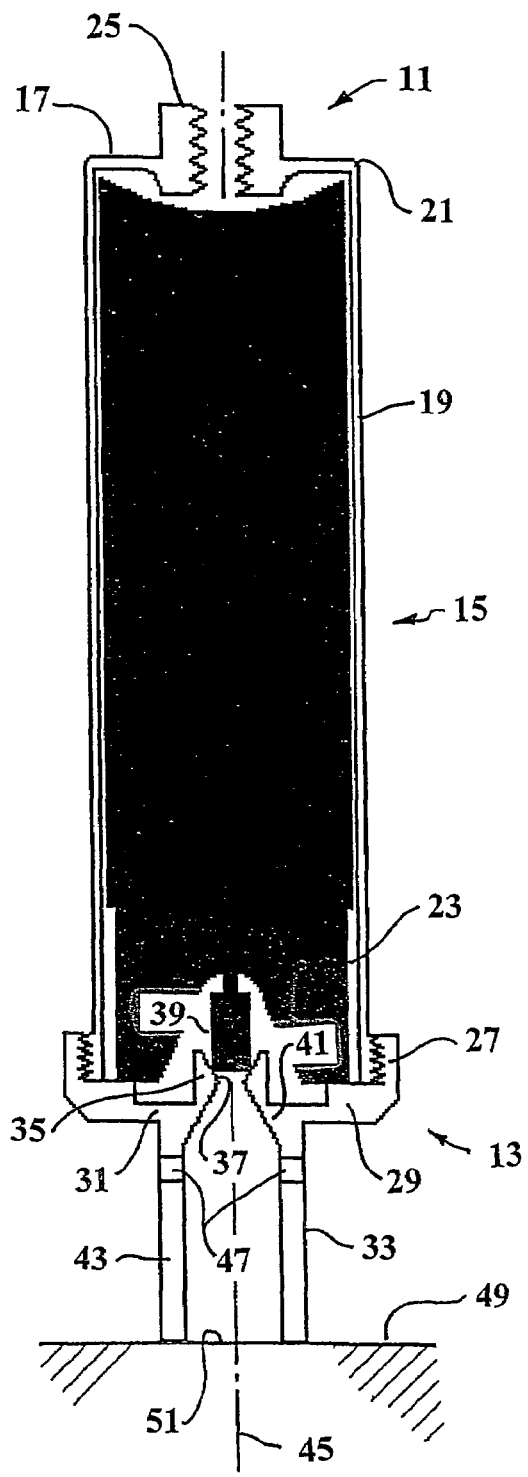
FIG. 2 is a diametric cross-sectional view of the attachment of FIG. 1.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Looking at the Figures, the target surface marking attachment for a surveyor's instrument has a coupling 11, a cap 13 and a co-operable supporting structure 15 to hold this assembly together for movement in unison. As shown, the coupling 11 and the supporting structure 15 consist of the top 17 and the side walls 19 of a container 21. The container 21 is contoured to hold a can 23 of aerosol paint in an inverted orientation. The height of the container 21 is substantially the same as the height of the can 23. Thus, when the cap 13 covers the open bottom of the container 21, the can 23 cannot slide axially in the container 21.

The top 17 of the container 21, as shown, has a central internally threaded tube 25 into which the lower end of the surveyor's instrument (not shown) can be threadedly engaged. The cap 13, as shown, is threadedly engaged 27 to the bottom of the container 21 and has a peripheral interior flange 29 against which the rim of the can 23 is sealed. The interior portion 31 of the cap 13 is resiliently pliant. As shown, this may be accomplished by making the interior portion 31 of the cap 13 substantially thinner than the flange 29. A nozzle 33 extends through the resiliently pliant portion 31 of the cap 13. The upper portion 35 of the nozzle 33 is upwardly outwardly tapered to provide a seat 37 to guide the valve 39 of the can 23 into the nozzle 33 and to abut and support the nozzle 33 when the can 23 is sealed against the flange 29 of the cap 13. The middle portion 41 of the nozzle 33 tapers downwardly and outwardly below the seat 37 to expand the nozzle 33. Preferably, the nozzle 33 is expanded to an approximately 1 inch inner diameter. The lower portion 43 of the nozzle 33 extends cylindrically downwardly from the expanding middle portion 41.

As shown, it is preferred that the coupling tube 25, the valve 39 of the can 23 and the nozzle 33 are all concentrically aligned on a common axis 45 so that force applied to the instrument is aligned through the axial center of the nozzle 33. The lower portion 43 of the nozzle 33 may have one or more vent holes 47 so that excess paint can be exhausted radially from the nozzle 33 to reduce the possibility of clogging the nozzle 33. Other than the resiliently pliable portion 31 of the cap 13, the components of the attachment are sufficiently rigid so as not to appreciably distort when force is applied to flex the resiliently pliable portion 31. The attachment components may be made of any suitable material provided the inner portion 31 of the cap 13 is able to resiliently flex and the other components have sufficient resistance to distortion to allow the inner portion 31 to flex.

In operation, the aerosol paint can 23 is loaded in its inverted condition into the container 21 and the cap 13 is screwed in place until the cap flange 29 seals against the rim of the can 23. In this condition, the valve 39 of the can 23 should be extending into and engaged against the seat 37 of the nozzle 33. The attachment is secured to the lower end of the surveyor's instrument (not shown) by threading the lower end of the instrument into the threaded tube 25 on the top 17 of the container 21. The surveyors can now use the surveying instrument (not shown) in the usual manner except that, rather than the lower end of the instrument being in contact with the surface 49 to be marked, the lower end of the nozzle 33 is rested on the surface 49. When the target point has been accurately determined, the cylindrical portion 43 of the nozzle 33 will be surrounding the target surface 51. The application of downward force by the surveyor on the surveying instrument (not shown) causes the side walls 19 of the container 21 to press downwardly on the peripheral flange 29 of the cap 13. This, in turn, drives the seat 37 of the nozzle 33 upwardly against the valve 39 of the can 23, causing the valve 39 to release paint into the nozzle 33 to coat the target surface 51. The target surface 51 is thus marked without ever moving the nozzle 33 from the accurate position.

Figure 3:
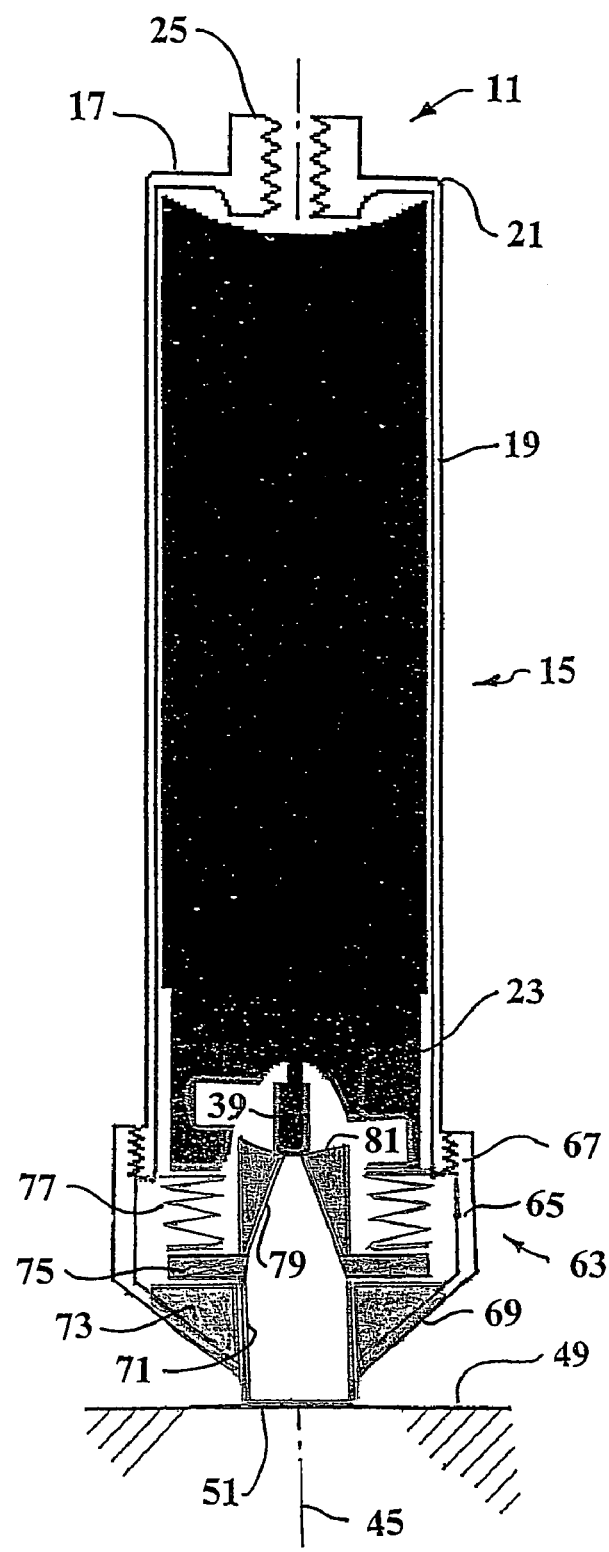
FIG. 3 is a diametric cross-sectional view of an alternate embodiment of the target surface marking attachment for a surveyor's instrument.

Turning to FIG. 3, an alternate embodiment of the target surface marking attachment is illustrated having a cap 63 which does not have a resiliently pliable portion. In this embodiment, the sidewalls 65 of the cap 63 extend considerably below threaded engagement 67 on the sidewalls 19 of the container 21. The lower portion 69 of the cap 63 is conical and there is a central opening through which a nozzle 71 extends. A guide seat 73 in the conical section 69 of the cap 63 guides vertical reciprocation of the nozzle 71. A flange 75 around the midportion of the nozzle 71 is seated on the guide seat 73. A coil spring 77 around the upper portion of the nozzle 71 between the flange 75 and the can 23 biases the nozzle 71 against movement toward the valve 39. The upper interior portion of the nozzle 71 tapers to the valve 39 and the valve 39 is seated on the inwardly tapered valve seat 81 of the nozzle 71. The valve 39 is not actuated when the nozzle flange 75 merely rests on its seat 73. However, when force is applied to the surveying instrument (not shown), the nozzle 71 is driven upwardly against the coil spring 77 to overcome the bias and actuate the valve 39, dispensing paint from the can 23 into the nozzle 71.

In variations of the above described attachments, the couplings 11 and the caps 13 and 63 could be separately attached by supporting structure directly to the top and bottom of the can 23. In these configurations, the side walls 19 of the can 23 apply the downward forces from the coupling 11 to the caps 13 and 63.

Thus, it is apparent that there has been provided, in accordance with the invention, a target surface marking attachment for a surveyor's instrument that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For triggering dispensation of paint through a valve of an aerosol can onto a surface target in response to manipulation of a surveyor's instrument, an attachment comprising a cap adapted to seal against a valve end of the aerosol can, said cap having a resiliently pliable central portion with a nozzle therethrough, said nozzle being aligned and contoured to seat the valve of the aerosol can thereon when said cap is sealed against the can and extending downwardly from said pliable central portion of said cap and means for connecting a lower end of the instrument to said cap whereby, when said nozzle is rested on and the surveyor's instrument is pressed toward the surface target, said resiliently pliable central portion of said cap flexes to actuate the valve and dispense paint through the nozzle onto the surface target.

2. For triggering dispensation of paint through a valve of an aerosol can onto a surface target in response to manipulation of a surveyor's instrument, an attachment comprising a container of height substantially equal to the height of the aerosol can and contoured to hold the aerosol can in an inverted orientation, said container having an upper end adapted for connection to a lower end of the surveyor's instrument and a cap on a lower end of said container, said cap having a resiliently pliable central portion with a nozzle therethrough, said nozzle having a throat aligned to seat the valve of the aerosol can thereon when the can is held in said container whereby, when said nozzle is rested on and the surveyor's instrument is pressed toward the surface target, said resiliently pliable central portion of said cap flexes to actuate the valve and dispense paint through the nozzle onto the surface target.

3. For triggering dispensation of paint through a valve of an aerosol can onto a surface target in response to manipulation of a surveyor's instrument, an attachment comprising a cylindrical container of height substantially equal to the height of the aerosol can and contoured to hold the aerosol can in an inverted orientation, said container having an upper end adapted for concentric connection to a lower end of the surveyor's instrument, a cap on a lower end of said container, said cap having a resiliently pliable central portion with a central nozzle therethrough, said nozzle extending concentrically upwardly to seat the valve of the aerosol can thereon when the can is held in said container and extending concentrically downwardly below said cap whereby, when said nozzle is rested on and the surveyor's instrument is pressed toward the surface target, said resiliently pliable central portion of said cap flexes to actuate the valve and dispense paint through the nozzle onto the surface target.

4. An attachment according to claim 3, said cap being threadedly engaged on said container to permit replacement of the can.

5. An attachment according to claim 3, said container being sufficiently rigid to resist distortion when said resiliently pliable central portion of said cap is flexed.

6. An attachment according to claim 3, said nozzle having at least one vent hole through a downwardly depending side wall thereof.

7. An attachment according to claim 3, said nozzle having an approximately one inch inside diameter.

8. An attachment according to claim 3, said container upper end adaptation being an inside threaded tube axially aligned through said upper end of said container.

9. For triggering dispensation of paint through a valve of an aerosol can onto a surface target in response to manipulation of a surveyor's instrument, an attachment comprising a cylindrical container of height substantially equal to the height of the aerosol can and contoured to hold the aerosol can in an inverted orientation, said container having an upper end adapted for concentric connection to a lower end of the surveyor's instrument, a cap on a lower end of said container, said cap having an outer annular flange, a concentric resiliently pliable central portion and a concentric nozzle therethrough, said nozzle having an upper expanding throat extending concentrically to seat the valve of the aerosol can therein when the can is held in said container and said nozzle extending downwardly below said cap whereby, when said nozzle is rested on and the surveyor's instrument is pressed toward the surface target, said resiliently pliable central portion of said cap flexes to actuate the valve and dispense paint through the nozzle onto the surface target.

10. An attachment according to claim 9, said nozzle having a downwardly expanding throat extending below said upper expanding throat to the top of a constant diameter throat.

11. For triggering dispensation of paint through a valve of an inverted aerosol can onto a surface target in response to manipulation of a surveyor's instrument, an attachment comprising a coupling adapted for connection to a lower end of the surveyor's instrument, a cap adapted to seal against a valve end of the inverted aerosol can, means for securing the coupling, inverted aerosol can and cap for motion in unison and a nozzle defining a path of pneumatic communication from the valve through a resiliently pliable portion of said cap whereby, when said nozzle is rested on and the surveyor's instrument is pressed toward the surface target, said resiliently pliable portion of said cap flexes to actuate the valve and dispense paint through the nozzle onto the surface target.

12. An attachment according to claim 11, said coupling and said securing means co-operating to align the surveyor's tool and the valve of the aerosol can on a common axis.

13. An attachment according to claim 11, said cap and said securing means co-operating to align the valve of the aerosol can and said nozzle on a common axis.

14. An attachment according to claim 11, said coupling, said cap and said securing means co-operating to align the surveyor's tool, the valve of the aerosol can and said nozzle on a common axis.

15. An attachment according to claim 14, said nozzle having an upper throat tapering upwardly outwardly to seat the valve of the aerosol can therein, a middle throat tapering downwardly outwardly from a lower end of said upper throat and a lower throat extending cylindrically downwardly from a lower end of said middle throat to a target end of said nozzle.

16. An attachment according to claim 15, said cylindrical throat having an approximately one inch inside diameter.

17. An attachment according to claim 14, said cylindrical throat having at least one vent hole through a side wall thereof.

18. An attachment according to claim 11, said coupling comprising an inside-threaded tube.

19. An attachment according to claim 11, said cap being detachably connectable to said securing means to permit replacement of the can.

20. An attachment according to claim 11, said coupling and said securing means being sufficiently rigid to resist distortion when said resiliently pliable portion of said cap is flexed.

21. For triggering dispensation of paint through a valve of an aerosol can onto a surface target in response to manipulation of a surveyor's instrument, an attachment comprising a cap adapted to cover a valve end of the aerosol can, a nozzle reciprocally slidable in and extending through said cap and having a throat aligned to seat the valve of the aerosol can thereon when said cap covers the valve end of the can, means for biasing said nozzle against motion toward the valve and means for connecting a lower end of the instrument to the can whereby, when said nozzle is rested on and the surveyor's instrument is pressed toward the surface target to overcome said biasing means, the valve is actuated to dispense paint through the nozzle onto the surface target.

22. For triggering dispensation of paint through a valve of an aerosol can onto a surface target in response to manipulation of a surveyor's instrument, an attachment comprising a container of height greater than the height of the aerosol can and contoured to hold the aerosol can in an inverted orientation, said container having an upper end adapted for connection to a lower end of the surveyor's instrument, a cap on a lower end of said container, a nozzle reciprocally slidable in and extending through said cap and having a throat aligned to seat the valve of the aerosol can thereon when the can is held in said container and a compression spring biasing the can against motion toward said nozzle whereby, when said nozzle is rested on and the surveyor's instrument is pressed toward the surface target to overcome said compression spring, the valve is actuated to dispense paint through the nozzle onto the surface target.

* * * * *